United States Patent
Ramachandran et al.

(10) Patent No.: US 9,367,811 B2
(45) Date of Patent: Jun. 14, 2016

(54) CONTEXT AWARE LOCALIZATION, MAPPING, AND TRACKING

(71) Applicant: QUALCOMM Incorporated, San Diego, CA (US)

(72) Inventors: Mahesh Ramachandran, San Diego, CA (US); Ashwin Swaminathan, San Diego, CA (US); Shankar Sadasivam, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 288 days.

(21) Appl. No.: 13/842,928

(22) Filed: Mar. 15, 2013

(65) Prior Publication Data
US 2014/0279790 A1    Sep. 18, 2014

(51) Int. Cl.
G06F 17/00    (2006.01)
G06N 5/02    (2006.01)
G06N 7/00    (2006.01)

(52) U.S. Cl.
CPC ..................................... G06N 7/005 (2013.01)

(58) Field of Classification Search
USPC .......................................................... 706/46
See application file for complete search history.

(56) References Cited

U.S. PATENT DOCUMENTS

| | | | |
|---|---|---|---|
| 7,587,276 B2 | 9/2009 | Gold et al. | |
| 7,729,531 B2* | 6/2010 | Winn et al. | 382/155 |
| 8,116,928 B2 | 2/2012 | Wu et al. | |
| 8,625,902 B2* | 1/2014 | Baheti | G06K 9/6857 382/190 |
| 9,013,550 B2* | 4/2015 | Jiang | G06T 7/0044 348/46 |
| 9,013,617 B2* | 4/2015 | Ramachandran | G01C 25/00 348/208.1 |
| 9,014,421 B2* | 4/2015 | Ramachandran | G06T 7/2066 340/436 |
| 9,025,856 B2* | 5/2015 | Ramachandran | B25J 9/1697 382/153 |
| 9,116,001 B2* | 8/2015 | Brunner | G01C 21/16 |
| 9,116,938 B2* | 8/2015 | Swaminathan | G06F 17/30321 |
| 9,123,135 B2* | 9/2015 | Ramanandan | G06T 7/2053 |
| 9,143,402 B2* | 9/2015 | Tinnakornsrisuphap | H04L 41/0809 |
| 9,159,133 B2* | 10/2015 | Ramanandan | G06T 7/004 |
| 9,177,404 B2* | 11/2015 | Ramachandran | G06T 7/0071 |
| 9,223,804 B2* | 12/2015 | Swaminathan | G06F 17/3028 |
| 9,256,788 B2* | 2/2016 | Ramachandran | G06K 9/00711 |
| 2010/0265327 A1 | 10/2010 | Niem et al. | |
| 2011/0177845 A1 | 7/2011 | Fasold | |
| 2011/0276401 A1 | 11/2011 | Knowles et al. | |
| 2011/0316880 A1 | 12/2011 | Ojala et al. | |
| 2012/0054204 A1 | 3/2012 | Agarwal et al. | |

(Continued)

OTHER PUBLICATIONS

Identifying semantically equivalent object fragments Epshtein, B.; Ullman, S. Computer Vision and Pattern Recognition, 2005. CVPR 2005. IEEE Computer Society Conference on Year: 2005, vol. 1 pp. 2-9 vol. 1, DOI: 10.1109/CVPR.2005.180 IEEE Conference Publications.*

(Continued)

Primary Examiner — Michael B Holmes
(74) Attorney, Agent, or Firm — Kilpatrick Townsend & Stockton LLP (57) ABSTRACT

Exemplary methods, apparatuses, and systems infer a context of a user or device. A computer vision parameter is configured according to the inferred context. Performing a computer vision task, in accordance with the configured computer vision parameter. The computer vision task may by at least one of: a visual mapping of an environment of the device, a visual localization of the device or an object within the environment of the device, or a visual tracking of the device within the environment of the device.

55 Claims, 3 Drawing Sheets (56) References Cited

U.S. PATENT DOCUMENTS

2012/0262582 A1 10/2012 Kimchi et al.
2013/0035110 A1 2/2013 Sridhara et al.
2013/0050180 A1 2/2013 Bruemmer

OTHER PUBLICATIONS

Pictorial structures revisited: People detection and articulated pose estimation Andriluka, M.; Roth, S.; Schiele, B. Computer Vision and Pattern Recognition, 2009. CVPR 2009. IEEE Conference on Year: 2009 pp. 1014-1021, DOI: 10.1109/CVPR.2009.5206754 IEEE Conference Publications.*

Is There a Procedural Logic to Architecture? Weissenberg, J.; Riemenschneider, H.; Prasad, M.; Van Gool, L. Computer Vision and Pattern Recognition (CVPR), 2013 IEEE Conference on Year: 2013 pp. 185-192, DOI: 10.1109/CVPR.2013.31 IEEE Conference Publications.*

Inferring Temporal Order of Images From 3D Structure Schindler, G.; Dellaert, F.; Sing Bing Kang Computer Vision and Pattern Recognition, 2007. CVPR '07. IEEE Conference on Year: 2007 pp. 1-7, DOI: 10.1109/CVPR.2007.383088 IEEE Conference Publications.*

International Search Report and Written Opinion—PCT/US14/023162—ISA/EPO—Oct. 31, 2014.

Bao et al., "Semantic Structure From Motion with Points, Regions, and Objects," 2012 IEEE Conference on Computer Vision and Pattern Recognition (CVPR), 2012, pp. 2703-2710.

Co-pending U.S. Appl. No. 13/725,753, filed Dec. 21, 2012.

Newcombe, et al., "DTAM: Dense Tracking and Mapping in Real-Time," 2011 IEEE International Conference on Computer Vission (ICCV), 2011, pp. 2320-2327.

Templeman, et al., "PlaceRaider: Virtual Theft in Physical Spaces with Smartphones," Technical Paper, CoRR arXiv Technical Report arXiv:1209.5982, Sep. 2012.

* cited by examiner

CONTEXT AWARE LOCALIZATION, MAPPING, AND TRACKING

FIELD

The subject matter disclosed herein relates generally to mapping, localization, and tracking.

BACKGROUND

Computer vision systems generally include methods for acquiring, processing, analyzing, and understanding images and, in general, high-dimensional data from the real world in order to produce numerical or symbolic information, e.g., in the forms of decisions. One known problem in computer vision is determining whether image data contains specific objects, features, or activities. While humans may be able to quickly solve the aforementioned problem, the field of computer vision systems is still a developing understanding for the general case of arbitrary objects in arbitrary situations.

Robust computer vision algorithms are highly beneficial to Augmented Reality use cases. There may be a variety of algorithms and parameters to achieve a particular task. Many computer vision algorithms depend on choices for parameters or features and are dependent on specific tuning for a particular scenario. No set of universal parameters or algorithms may work for all scenarios and it is difficult to infer these parameters "on the fly" without additional information.

Accordingly, improved computer vision techniques are desirable.

SUMMARY

Embodiments disclosed herein may relate to a method for performing a computer vision task. The method may include inferring a context of a user or device, and configuring a computer vision task according to the inferred context. The method may further include performing the computer vision task including at least one of: a visual mapping of an environment of the device, a visual localizing of the device or an object within the environment of the device, or a visual tracking of the device within the environment of the device.

Embodiments disclosed herein may relate to a machine readable non-transitory storage medium with instructions for performing a method, the method including a computer vision task. The method may further include inferring a context of a user or device, and configuring a computer vision task according to the inferred context. The method may further include performing the computer vision task including at least one of: a visual mapping of an environment of the device, a visual localizing of the device or an object within the environment of the device, or a visual tracking of the device within the environment of the device.

Embodiments disclosed herein may also relate to an apparatus that includes means for performing a computer vision task. The apparatus further including inferring a context of a user or device, and configuring a computer vision task according to the inferred context. The apparatus may further include performing the computer vision task including at least one of: a visual mapping of an environment of the device, a visual localizing of the device or an object within the environment of the device, or a visual tracking of the device within the environment of the device.

Embodiments disclosed herein may further relate to a data processing system including a processor and a storage device configurable to store instructions to perform a computer vision task. The data processing system further configured to infer a context of a user or device, configure a computer vision task according to the inferred context, and perform the computer vision task. The computer vision task further configured for at least one of: a visual mapping of an environment of the device, a visual localizing of the device or an object within the environment of the device, or a visual tracking of the device within the environment of the device.

Other features and advantages will be apparent from the accompanying drawings and from the detailed description.

DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figure 1:
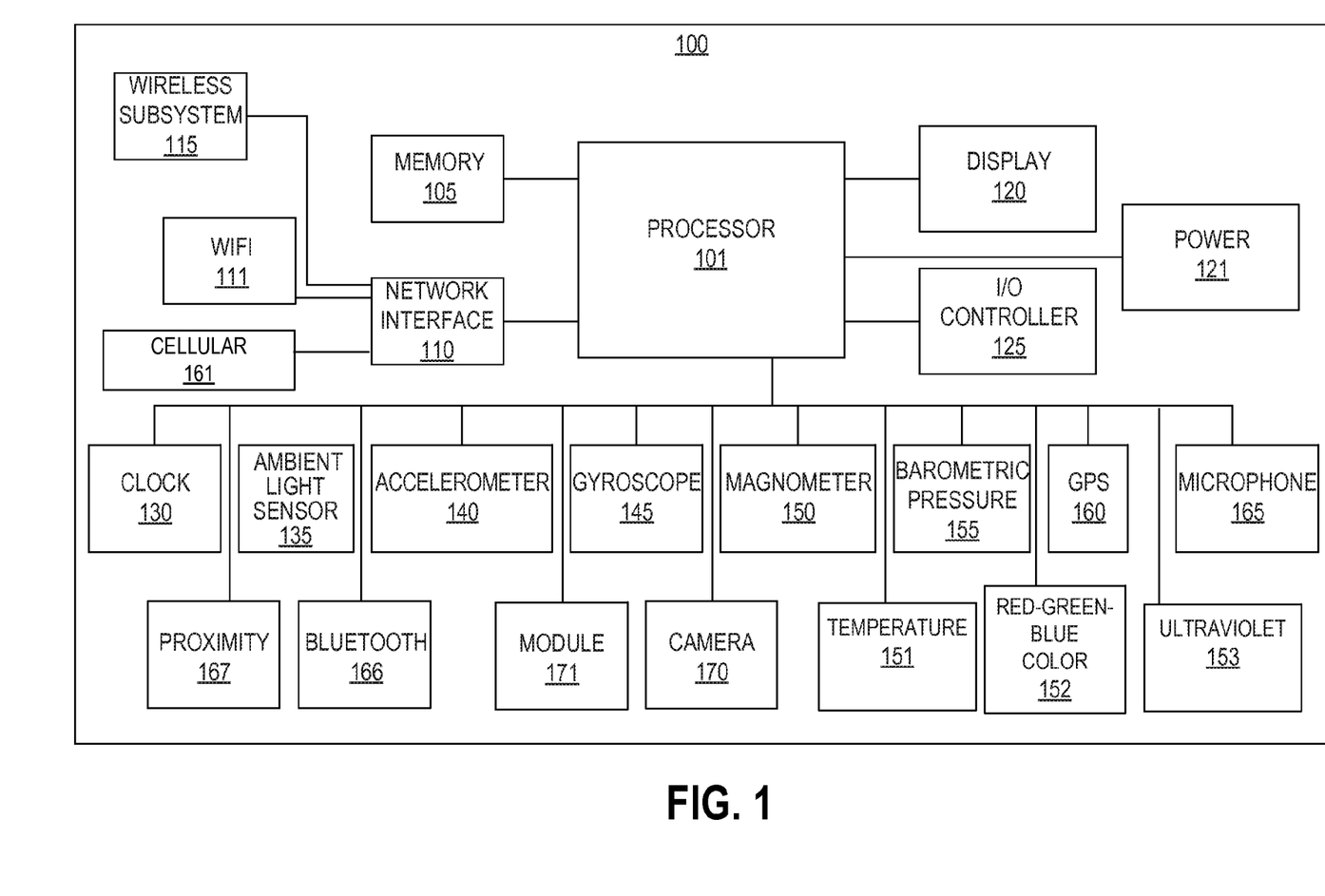
FIG. 1 is a block diagram of a system in which aspects of the invention may be practiced, in one embodiment.

FIG. 1 is block diagram illustrating an exemplary data processing system in which embodiments of described herein may be practiced. The system may be a device (e.g., the device 100), which may include one or more processors 101, a memory 105, I/O controller 125, and network interface 110. Device 100 may also include a number of device sensors coupled to one or more buses or signal lines further coupled to the processor 101. It should be appreciated that device 100 may also include a display 120, a user interface (e.g., keyboard, touch-screen, or similar devices), a power device 121 (e.g., a battery), as well as other components typically associated with electronic devices. In some embodiments device may be a mobile or non-mobile device. Network interface 110 may also be coupled to a number of wireless subsystems 115 (e.g., Bluetooth 166, WiFi 111, Cellular 161, or other networks) to transmit and receive data streams through a wireless link to/from a wireless network, or may be a wired interface for direct connection to networks (e.g., the Internet, Ethernet, or other wireless systems). Thus, device may be a: mobile device, wireless device, cell phone, personal digital assistant, mobile computer, wearable device (e.g., head mounted display, virtual reality glasses, etc.), robot navigation system, tablet, personal computer, laptop computer, or any type of device that has processing capabilities.

The device (e.g., device 100) can include sensors such as a clock 130, ambient light sensor (ALS) 135, accelerometer 140, gyroscope 145, magnetometer 150, temperature sensor 151, barometric pressure sensor 155, red-green-blue (RGB) color sensor 152, ultra-violet (UV) sensor 153, UV-A sensor, UV-B sensor, fingerprint sensor, touch sensor, compass, Bluetooth 166, WiFi 111, cellular 161, proximity sensor 167 and/or Global Positioning Sensor (GPS) 160. In some embodiments, microphone 165, camera 170, and/or the wireless subsystem 115 are used as sensors to analyze the environment of the device. In some embodiments, multiple cameras are integrated or accessible to the device. For example, a mobile device may have at least a front and rear mounted camera. In another example, a robot navigation system may have multiple different cameras to capture a variety of viewpoints of the robot. In some embodiments, other sensors may also have multiple copies or versions.

Memory 105 may be coupled to processor 101 to store instructions for execution by processor 101. In some embodiments, memory 105 is non-transitory. Memory 105 may also store one or more models or modules to implement embodiments described below. Memory 105 may also store data from integrated or external sensors. In addition, memory 105 may store application program interfaces (APIs) for accessing modules 171 (e.g., application data module, context module, localization module, mapping module, and tracking module). Memory 105 may also store configuration files describing pre-defined feature scheduling information, training data sample, sensor data sample, or power profiles related to classes or features. While modules 171 are illustrated separate from other elements in the device 100, the module 171 may be wholly or partially implemented by other elements illustrated in FIG. 1, for example in the processor 101 and/or memory 105, or in another processor and/or memory of the device 100 or in one or more other elements of the device 100. Additional details regarding implementation of the module 171 are described below.

It should be appreciated that embodiments of the systems and method described herein as will be hereinafter described may be implemented through the execution of instructions, for example as stored in the memory 105 or other element, by processor 101 of device and/or other circuitry of device and/or other devices. Particularly, circuitry of device, including but not limited to processor 101, may operate under the control of a program, routine, or the execution of instructions to execute methods or processes in accordance with embodiments of the present disclosure. For example, such a program may be implemented in firmware or software (e.g. stored in memory 105 and/or other locations) and may be implemented by processors, such as processor 101, and/or other circuitry of device. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines or modules described herein may be performed by device itself and/or some or all of the functions, engines or modules described herein may be performed by another system connected through I/O controller 125 or network interface 110 (wirelessly or wired) to device. Thus, some and/or all of the functions may be performed by another system and the results or intermediate calculations may be transferred back to device. In some embodiments, such other device may comprise a server configured to process information in real time or near real time. In some embodiments, the other device is configured to predetermine the results, for example based on a known configuration of the device. Further, one or more of the elements illustrated in FIG. 1 may be omitted from the device 100. For example, one or more of the sensors 130-165 may be omitted in some embodiments.

The device (e.g., device 100) may use one or more sensors or application data to gather environmental information and infer a context associated with the device. In one embodiment, context aware localization, mapping, and tracking (CALMT) can determine one or more of: which image based features to apply, suitable models or representations of objects or environments, optimized implementations for a given localization, mapping, and tracking task, optimal parameter settings, efficient sensor sampling strategies, and when to initialize mapping, localization, or tracking, just to name a few.

Context and contextual information as used herein can be any information that can be used to characterize the situation of the device (e.g., device 100) or the situation of a user of the device. In some embodiments, context can include one or more of: location, motion, activity, and environment as described in greater detail below.

Figure 2:
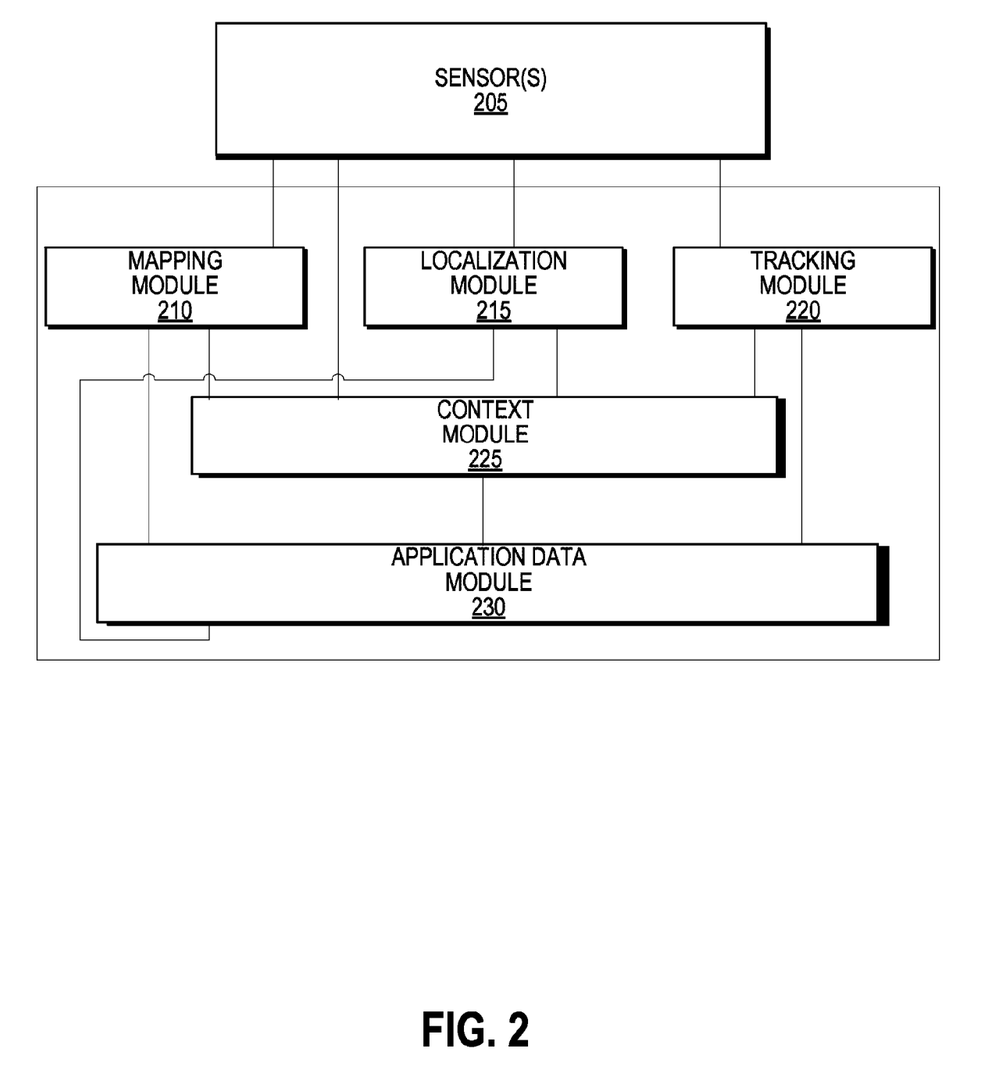
FIG. 2 is block diagram illustrating a subsection of the system including sensors and exemplary processing modules, in one embodiment.

FIG. 2 is block diagram illustrating a subsection of the device 100 including sensors 205 and exemplary processing modules 171, in one embodiment. The modules 171 may be implemented directly in hardware or firmware, for example as a subcomponent of the device 100 with a dedicated processor or an implementation sharing a central processing unit (e.g., processor 101). Alternatively, the modules may be implemented in software executed by a processor, or with a combination of software and hardware. The software module may reside in memory, for example, memory 105 or other form of storage media known in the art. The modules discussed herein may represent a functional process for carrying out aspects of computer vision tasks that can be implemented in a variety of alternative implementations. While the localization module 215, mapping module 210, tracking module 220, context module 225, and application data module 230 are separately illustrated in FIG. 2, the functionality of one or more of these modules may be combined or may be distributed in a different manner than described above. For example, the context module 225 and tracking module 220, or localization module, or mapping module, may be combined in some embodiments. Similarly, the context module and application data module may be combined in some embodiments. In some embodiments the CALMT as described herein is implemented as a module and the above mentioned modules (e.g., tracking, mapping, localization, classifier, context, and application data) are sub-modules or components of the CALMT system or module. Other combinations of modules are also possible using any of the modules 171.

The sensors 205 may comprise any one or more of a clock 130, ambient light sensor (ALS) 135, accelerometer 140, gyroscope 145, magnetometer 150, temperature sensor 151, microphone 165, barometric pressure sensor 155, camera 170, red-green-blue (RGB) color sensor 152, ultra-violet (UV) sensor 153, UV-A sensor, UV-B sensor, fingerprint sensor, touch sensor, compass, Bluetooth 166, WiFi 111, cellular 161, proximity sensor 167 and/or Global Positioning Sensor (GPS) 160 or other sensors.

In one embodiment, the localization, tracking, and mapping modules can perform one or more of localization, tracking, and mapping tasks as described in greater detail below. In one embodiment, the localization, tracking, and mapping modules can receive or request a context determination from the context module 225. The context module 225 may request and receive sensor data from the sensors 205 and the application data module 230. In other embodiments, the localization, tracking, and mapping modules may be configured to perform context determination without the aid of the context module 225, and the localization, tracking, and mapping modules may directly request and receive data from the sensors 205 and application data module 230.

Figure 3:
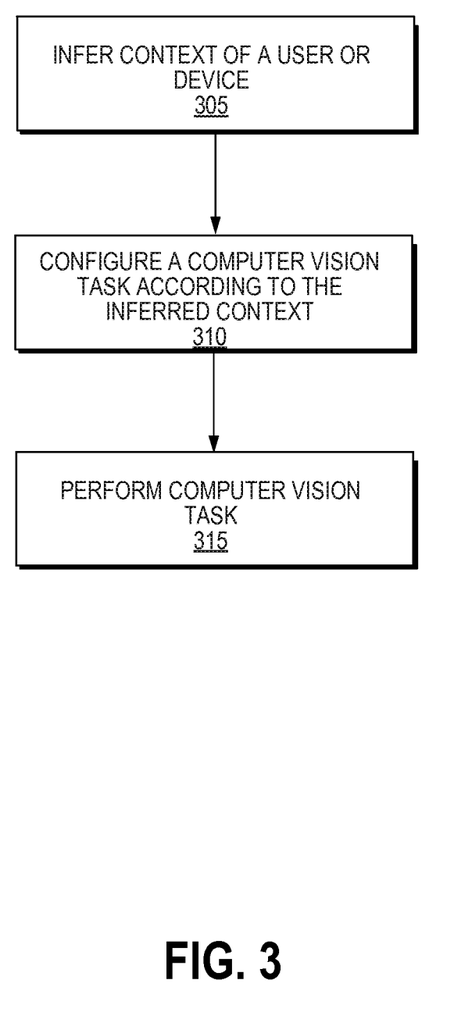
FIG. 3 illustrates a flow diagram of one embodiment of a method for localization, mapping, and tracking.

FIG. 3 illustrates a flow diagram of a method for context aware localization, mapping, and tracking, in one embodiment. At block 305, the CALMT can infer context of a user or device. In other embodiments, the CALMT may receive context from a configuration file or directly from the context module. Details on context determination are discussed in greater detail below.

At block 310, the CALMT can configure a computer vision task according to the inferred context. For example the computer vision task may be one or more of a plurality of localization, mapping, and tracking. The inferred context may be from one or more sensor streams (e.g., sensors 205) or applications (e.g., application data module 230). For example, depending on the environment of a device or user (e.g., location, environment, activity, or motion) the CALMT can refer to matching optimization parameters to apply to a specific localization, mapping, and tracking implementation.

At block 315, the CALMT can perform the computer vision task. For example, the CALMT may execute one or more of: localization, mapping, and tracking, according to an optimized profile or configuration (e.g., a computer vision parameter configured according to context).

In one embodiment, context is related to location, motion, activity, and environment of the device or the user. The CALMT may obtain information about the circumstances under which the device and user are operating and based on rules, or an intelligent stimulus, can react accordingly. In determining context, the CALMT or the context module may make certain assumptions or inferences about the device and/or user's current situation. In some embodiments, the device may not have an associated user (e.g., robot navigation) and context may relate predominantly to the environment and surroundings of the device irrespective of any user.

In some embodiments, context may be determined by a context engine or module. The context engine or module may be separate engine or module from the CALMT, or the context engine or module may be integrated into the CALMT.

In some embodiments, when the device is a mobile device (e.g., smartphone, navigation, wearable computer, or other electronic portable device) the CALMT may use how users typically interact (e.g., activity context) with their mobile device to determine context. For example, if the accelerometer in a mobile device records seemingly random readings, the context engine or CALMT may, upon a determination that the accelerometer is coupled to a mobile device, infer that the user is fidgeting with the mobile device.

The CALMT may read raw sensor data from one or more device sensors (e.g., sensors 205). For example, a clock 130, ambient light sensor (ALS) 135, accelerometer 140, gyroscope 145, magnetometer 150, temperature sensor 151, microphone 165, barometric pressure sensor 155, camera 170, red-green-blue (RGB) color sensor 152, ultra-violet (UV) sensor 153, UV-A sensor, UV-B sensor, fingerprint sensor, touch sensor, compass, Bluetooth 166, WiFi 111, cellular 161, proximity sensor 167 and/or Global Positioning Sensor (GPS) 160. The device may use sensors to infer a context of the device (i.e., location, motion, activity, and environment). For example, the CALMT may use the sensors to detect objects and features within the environment that are useful for determining context(s).

In some embodiments, the CALMT may read or process soft sensor data and application data (e.g., application data module 230) in addition to or instead of raw sensor data. Application data may include data from one or more mobile or device applications such as: calendar, geo tagging, social media data (e.g., facebook, twitter, linkedin, etc.), battery, time of day, just to name a few. For example, based on being in a close proximity to social network friends or "checking in" to locations can be used to determine device location or dynamism.

In some embodiments, leveraging data from the one or more sensors or applications, the CALMT can infer a context of the device or user. For example, the CALMT may read Bluetooth data to determine that a high concentration of nearby devices are broadcasting Bluetooth signals and therefore it may be likely the mobile device is in an urban environment such as a shopping mall, office space, farmers market, or other environment (e.g., location) where there is a large number of other people in close proximity.

In some embodiments, location context may include: home, office, corridor, mall, shopping area, restaurant, indoors, and outdoors, just to name a few.

In some embodiments, motion context may include: stationary, walking, running, sitting, standing, driving a car, riding a bike, riding a train, flying in a plane, and fiddling with a device, just to name a few.

In some embodiments, activity context may include: watching television, playing, reading, writing, meeting people, looking at a screen, giving a presentation, eating, shopping, cooking, attending a meeting, working alone, attending a talk, exercising, on a phone, listening to music, and sleeping, just to name a few.

In some embodiments, environment context may include: sunny, daylight, nighttime, cloudy, rainy, and snowing, just to name a few. As used herein, the environment context is related to the environment of the particular device (e.g., the device executing or integrated with the CALMT) or user if the device is on the user's person/nearby.

In one embodiment, context may be further categorized into sub categories of location, motion, activity, and environment. For example, location context may be include indoor context, outdoor context, uncluttered context, cluttered context. Furthermore, motion context may include an excited or unexcited context. As used herein the context may be two or more compatible contexts (e.g., indoors, uncluttered and excited, or any number of combinations).

In some embodiments, the CALMT can use a GPS (e.g., GPS 160) to determine a number of visible satellites and respective received signal strengths (RSSI). For example, based on the satellite reception and the RSSI, the CALMT can infer the device is indoors or outdoors. For example, no/weak satellite reception and low RSSI may infer the device is indoors.

In some embodiments, the CALMT can use geo tagging (e.g., from application data module 230, or application data accessible to the CALMT) to determine context. The CALMT can use geo tagging to discover a wide variety of location-specific information. For example, for a given location (e.g., latitude and longitude coordinates determined from a GPS) location-based information, statistics, landscape/building features, or other resources may be available. Furthermore, the presence of a large amount of geo tagging information for a particular location may infer how dynamic of an environment exists. For example, in one embodiment, tourist areas and shopping malls may have a greater amount of geo tagging information.

In some embodiments, the CALMT can use WiFi (e.g., WiFi 111) to determine context. For example, the number of visible access points and their respective RSSI's may indicate whether a device is indoors or outdoors. Further, WiFi based positioning can be used to infer the room in the building (e.g., conference rooms, office rooms, meeting rooms, home, etc). In some embodiments, the inferred locations can be compared to a map to further determine more precise location with an associated semantic meaning (e.g, meeting room versus in office). Also, the amount/availability of WiFi connections may indicate how dynamic the environment is. For example, an office or shopping mall may have greater than average numbers of WiFi connections and are dynamic environments.

In some embodiments, the CALMT can use a microphone (e.g., microphone 165) to detect audio direction or audio levels within in the environment of the device or user. In some embodiments, the CALMT can perform target sound detection to determine the speech environment (i.e., presence or absence of speech), audio clusters (possibly with pre-learnt labels), and use this information to a infer user and device situation. For example, based on processing microphone sensor data or audio samples, the CALMT can determine the device or user is indoors or outdoors and whether the user is in a meeting, on the phone, in a conference call, or working alone, just to name a few. Furthermore, the CALMT can use a change in audio environment to identify how dynamic the environment is. For example, measuring reverberation in the audio signal (i.e., delay spread) contributes to determining whether the sound is being bounced of interior surfaces (i.e., indoors). In one embodiment, for example, a loud sound level may determine that the device is in a busy area (i.e., dynamic environment), while a quiet sound level may infer a static environment. In some embodiments, if the device has multiple microphones, the sound can be localized to obtain audio directionality and this information could be further used to understand which area of the environment in proximity to the user is changing.

In some embodiments, the CALMT can use Bluetooth (e.g., Bluetooth 166) scans to indicate nearby devices (e.g., mobile devices, computers, accessories etc.). For example, in some embodiments, a high Bluetooth device count or broadcast density can infer that more devices are in environment around the user. In some embodiments, changes in the measured values (e.g., increase or decrease in number of Bluetooth devices in the environment) can infer that the environment is dynamic.

In some embodiments, the CALMT can use cellular signal strength (e.g., RSSI) to provide an indication of whether a device is indoors or outdoors. For example, lower signal strength may infer the device is indoors.

In some embodiments, the CALMT can use an accelerometer (e.g., accelerometer 140) to determine whether a device is on a user who is sitting, standing, walking, running, driving, flying, or if the device is at rest (i.e., stationary). For example, in some embodiments, if the device is in a driving state, then it is more likely to be outdoors. In some embodiments, the accelerometer can also be used to infer the position of the device. For example, the CALMT can determine the device is in user's shirt pocket, pant pocket, in hand, holster, or other position relative to the user.

In some embodiments, the CALMT can use the ambient light sensor (e.g., ALS 135), UV sensor, and RGB sensor to determine light intensity values consistent with being indoors or outdoors. For example light intensity values observed outdoors are typically much greater than the range of light intensity values observed indoors. Further, in some embodiments, if the ALS outputs a very high reading the confidence that the device is outdoors may be very high. In some embodiments, the CALMT may use one or more ALSs integrated into the front and/or back of the device and use an average or combined reading to determine context.

In some embodiments, the CALMT can use one or more camera(s) (e.g., camera 170, or RGB sensor) to infer context. For example, by computing red, green, and blue intensities averaged over all the pixels in the camera (e.g., front and/or back cameras) the color of the light can be assessed. In some embodiments, the color of light can indicate to the CALMT whether the light is sunlight or interior (e.g., florescent) light. Furthermore, the image data can be further processed to infer the presence of grass, sky, etc., to detect outdoors. In some embodiments, the CALMT can also use image data to infer the presence of ceilings and objects such as tables, chairs, computers, to determine the device and user are indoors.

In some embodiments, the CALMT may use a clock (e.g., clock 130) of the device to infer context. For example, if the device is a mobile device typically carried with a user, at certain times of the day users are much more likely to be indoors (e.g., late at night or early in the morning).

In some embodiments, the CALMT may use a temperature sensor (e.g., temperature sensor 151, or barometric pressure sensor 155) or other source to determine the environment weather. For example, if the device is a mobile device typically carried with a user, certain weather (e.g., snow, rain, or very cold, or very hot) may indicate a greater than normal likelihood that the device and user are indoors. In other embodiments, the CALMT may query a remote server (e.g., internet query or mobile application) to determine up to date weather information to use for context.

In some embodiments, the CALMT may use one or more sensors (e.g., accelerometer, and GPS) to determine an "excited" state of the device. For example, with rapid or extreme movements and motion (i.e., running), the user of the device may be in a heightened state (e.g., in a hurry), and the CALMT may further infer that the performance of tracking should be increased.

In some embodiments, the CALMT may use one or more sensors (e.g., microphone, Bluetooth, and GPS) to determine a "cluttered" state of the device. For example, the CALMT may determine based on the dynamic context previously described that the device is in a feature rich environment with multiple nearby objects. Furthermore, in some embodiments, the CALMT may determine a cluttered environment when the device is in a shopping location, such as inside a mall or store as determined from WiFi, GPS, geo tagging or other location determination in combination with a map of the current location. In other embodiments, the CALMT may query a remote server (e.g., internet query or mobile application) to determine additional location information to use to determine whether a current location is likely to be cluttered.

In some embodiments, the CALMT may use one geo tagging, GPS, and other techniques to derive information about a location to determine a "restricted" state of the device. For example, in a museum or private building computer vision generally and mapping specifically may be restricted based on the property owner's desire to maintain privacy or limit certain technologies.

In some embodiments, the above described context detection methods and techniques are not exhaustive all possible ways to determine context as described herein and are meant to be merely a few examples of how context for a device or user may be determined.

In some embodiments, in one embodiment, the CALMT can create context based configurations (e.g., a context parameter or computer vision task parameter) for the computer vision based algorithms or tasks for mapping, localization, or tracking. For example, configurations can include one or more of the following: a plurality of parameters controlling the performance of a computer vision algorithm or task, image features used by the CV algorithm or task, prior models of appearance or motion, etc.

In some embodiments, the CALMT can use appropriate context configurations to increase the performance or efficiency of localization, mapping, and tracking. In some embodiments, the choice of computer vision parameter may depend the context. In some embodiments, context may also help determine the values of certain parameters. Furthermore, in some embodiments, certain parameters may be more appropriate for visual mapping, visual localization and/or visual tracking, or any other combination. For example, localization or visual odometry does not need to build and maintain a very detailed scene map suitable for a complicated 3D reconstruction but can maintain a very sparse set of points using which it can localize; and these behaviors can be controlled by appropriate parameters.

In one embodiment, the CALMT determines context(s) and records or updates a context flag, description, or record accessible by the CALMT such that the CALMT can obtain context at any point in processing or performing computer vision. In some embodiments, the CALMT may create and maintain a general configuration or parameter file with optimized configurations to use for computer vision tasks in a variety of types of context. For example, the configuration file may contain all contexts and all possible parameters/configurations, and contexts and parameters may be linked or associated such that for any context an appropriate configuration can be determined. In some embodiments, the computer vision parameter can cause a respective computer vision task to use one or more optimizations or constraints as described in greater detail below.

In some embodiments, instead of reading separate configuration or parameter file with one or more different configurations associated with types of context, the localization, mapping, and tracking modules may be configured by the context module. Alternatively, in some embodiments, the localization, mapping, and tracking may update or self-configure in accordance with reading or receiving a context determination (e.g., from a context module). For example, the context engine can determine an indoor location context and configure mapping to use Manhattan world assumptions.

In some embodiments, context can improve the accuracy and robustness of computer vision tasks in various ways as discussed herein with exemplary implementations in mapping, localization, and tracking.

As used herein computer vision tasks may comprise one or more of mapping, localization, and tracking. Mapping (e.g., visual mapping) as used herein is related to building geometric and photometric representations of a scene/world from video or image input. Localization (i.e., visual localization) may be associated with the determining of a relative position of an object or the device within a map or scene. Tracking (e.g., visual tracking) as used herein may be associated with the determining of a change in relative position of the device within a map or scene.

In one embodiment, the CALMT can optimize mapping and 3D visual modeling by imposing constraints on the map environment based on context (e.g., location, environment, motion, and activity context as described in greater detail above).

For example, the CALMT or a context engine running on the device, can determine the device or user is indoors (i.e., location context) based on sensor data (e.g., sensors 205), or accelerometer application data such as from a calendar, social networks, geo tagging, etc. In this example, the indoor location context can be provided as input to the visual mapping system and the CALMT or mapping system can use this knowledge to load appropriate model priors before starting the mapping task.

In other embodiments, with the knowledge that the user/device is in indoor or outdoor environments, such information can be used to build model priors for mapping task. For example, most indoor environments contain regular structures with walls perpendicular to the floor, facades at right angles, etc. and this type of information can be useful to build the model prior. Alternatively, in some embodiments, if the context engine (e.g., context module 225) running on the device determines that the user is outdoors, the model priors can be appropriately modified to represent outdoor facades.

Leveraging such model priors and environment optimizations in the mapping task may result in faster processing; more accurate results, efficient convergence into the 3D model of the environment, and assist in low power map building. Leveraging such environment information or models in context specific mapping situations may create more accurate results than assuming a model or environment and ultimately correct for any error in assumption.

In an alternate embodiment, the knowledge about the type of location can enhance the mapping process by helping with the choice of the appropriate algorithm to be used for mapping. For example, if the CALMT has prior knowledge that the region that has minimal (i.e., less than a baseline) texture, the mapping system (e.g., mapping module 210) can determine to use an "edge-based" mapping algorithm. Alternatively, if the environment is known to have more (i.e., a high amount greater than baseline) texture such as paintings in museums, then the mapping system could use this information to use a "point-based" mapping algorithm. Furthermore, if the CALMT has reasonably accurate indoor positioning using algorithms such WiFi-localization, this can be bootstrapped into the mapping algorithm along with available information about building maps for improving the accuracy of the system.

In some embodiments, it may be possible to provide feedback to the user building the mapping system. In some embodiments, such information about user and device context can be used to suggest possible directions, such as where the user needs to point their device to obtain an improved map of the environment. For example, the CALMT may read or determine context and update a user interface on the display 120 of the device. In some embodiments, the user interface may contain directional indicators or elements (e.g., arrow, lines or other visual/audio indicator to prompt or direct a user to move the camera view to a different angle or in a specific direction).

In some embodiments, the user interface may be updated based on the context determination. For example, based on determining a dynamic context in the eastern direction of the device and a determination that a static context is detected in the western direction of the device, arrows directing the user to aim the camera view in the western direction may be provided. In other examples, a cluttered area may be desired or avoided in comparison to an uncluttered area and direction indictors can be provided on the device display to help the user aim the camera in specified directions. In one embodiment, the CALMT can use compass, GPS, accelerometer and microphone to track the camera view as well as the context of a scene or map captured in a respective camera view.

In one embodiment, the CALMT can determine when to initialize visual mapping, localization, or tracking. For example, the CALMT can delay visual mapping, localization, or tracking when a dynamic context is determined (e.g., by the context engine or module 225). In some embodiments, because dynamic scenes are inherently more difficult for many computer vision implementations than static scenes, the CALMT may use context to determine the whether the current context is a dynamic context and delay providing or processing computer vision until the scene becomes static. For example, a crowded shopping mall may be constantly changing due to people moving about the map or scene. Without enough fixed points to create and maintain accurate references, attempting to perform computer vision may result in wasted processing power and user frustration. Therefore, when the CALMT determines a scene or map is dynamic performing computer vision may be postponed. In some implementations, a message to a user of the device may be displayed and an option to attempt computer vision can be provided despite the possibility of poor performance in the dynamic scene.

In some embodiments, the CALMT may also, upon determining a dynamic context, select any number of cameras (e.g., front, rear camera, or one or more additional cameras) from a choice of cameras for computer vision. For example, a dynamic scene containing movement of objects (e.g., people, cars, etc.) within the scene may render some camera viewpoints ineffective. In some embodiments, based on a dynamic context determination, the CALMT can switch to an alternate view to capture floor and ceiling information for visual localization and tracking. In some embodiments, the CALMT further determines which camera to use by determining a dynamic context direction and coordinates with the camera(s) of the device to perform computer vision using static scenes from a static view.

In some embodiments, Keyframe (i.e., reference image) selection is an important problem for visual mapping of the environment and localization. In one embodiment, mapping parameters may be based on a determination of a cluttered context. In some embodiments, cluttered environments are potentially feature rich environments especially useful for computer vision. For example, inside stores within shopping malls may have objects that may be useful to users of computer vision (e.g., augmented reality representations for products). Based on the location of the mobile device in a cluttered context, a keyframe creation rate can be increased to obtain increased computer vision accuracy (e.g., in building a map or scene using visual mapping). Further, the Mapping and Localization system may also choose a different algorithm/approach based on the amount of clutter in the scene. In some embodiments, for example, the system could use lines, edges, and rectangle based features or point based features based on the amount of clutter.

In some embodiments, an uncluttered environment may be feature sparse, due to the predominance of open spaces and lack of detectable objects within the scene. Thus, in some embodiments. the CALMT may therefore optimize mapping and localization algorithms to use line features, vanishing points, and rectangles. In some embodiments, due to the lack of objects within a scene, mapping and localization algorithm may lower a keyframe rate to save power or conserve resources.

In some embodiments, a CALMT used with visual mapping, the CALMT may determine the mobile device is in a location with mapping restrictions. For example, a museum may not allow for visual mapping while in the museum. In some embodiments, the CALMT may disable visual mapping upon determining the environment of the mobile phone (e.g., context) is a museum with restrictions on mapping and tracking.

In one embodiment, a number of mapping, localization and tracking parameters may be based on a determination of an indoor location context. For example, based on knowing that the device is indoors based on user context, mapping, localization and tracking parameters may be chosen appropriately. In some embodiments, for example, such algorithms or tasks may leverage Manhattan world assumptions for office locations, prior knowledge of object and object types in environment (e.g., office locations may contain computers, laptops, monitors, file cabinets, fax machines, etc. while home environments may contain objects such as blenders, microwaves, televisions, game consoles, sofa, beds, etc.), bounded interior scene dimensions, or modeling a map in terms of floor, wall and ceiling surfaces.

In some embodiments, bounded interior scene dimensions optimize visual mapping by setting limits to the structure of the map. In some embodiments, specifying bounded interior scene dimensions is useful to constrain a model or map to dimensions that are more quickly calculated and updated than if no knowledge about dimensions were known. For example, 7 to 10 foot ceiling and walls may be more likely when indoors. In some embodiments, for example, for an outdoor context, boundaries on the map may be potentially limitless.

In some embodiments, indoor environments have regular rectangles that are aligned with the coordinate system and this information can be used as model priors to the mapping algorithm. In some embodiments, similar to using bounded interior constraints above, an aligned rectangle coordinate system optimizes visual mapping to the aligned rectangle coordinate system so mapping system does not have to try or test other coordinate systems before determining a most accurate setting. In some embodiments, by first determining an indoor context (e.g., receiving context from the context module, or reading sensor/application data to determine context), the CALMT can perform visual mapping, localization, and tracking with the most effective coordinate system for use in indoor scenes.

In some embodiments, a computer vision parameter can also specify the use of predetermined indoor objects and indoor structures to be used in computer vision (e.g., visual mapping). For example, common indoor objects such as doors, knobs, desks, cups, a computer, etc. can be used to more efficiently estimate the pose and location of the camera view from captured images. In some embodiments, common indoor structures are walls, ceilings, doors, windows, etc. In some embodiments, one problem in computer vision is to recover the structure of a scene and estimate a pose and location of the camera viewpoint. In some embodiments, a structure from motion (SFM) algorithm attempts to represent the structure of a scene as a set of 3D points. However, point based representations are often insufficient for robust computer vision because 3D point based representations may not inherently provide any semantic information. In some embodiments, by configuring computer vision to more easily recognize common indoor objects and structures, the indoor objects and an entire scene or map are more likely to be accurately modeled. For example, by expecting one or more predetermined indoor objects or structures in a scene, computer vision may search for properties associated with the objects or structures. In some embodiments, once a predetermined object or structure is detected, the semantic information of the object can be used to model the interaction between the camera view and the object, as well as the object and the surrounding scene.

In some embodiments, the indoor context can be beneficial to localization tasks. For instance, if the type of the indoor location is known, the CALMT can determine if the location is more likely to contain high or low amount of texture. Such information can be used to choose the localization approach and whether "point-based", "line-based", "edge-based" or "rectangle-based" solutions are to be used.

In another embodiment, if the location is known to be structures such as architectural scenes, such information can be used to choose one or more cameras among the plurality of cameras that are most useful for the localization task. For instance, if it is known that the ceiling contains repeated information, the camera pointing upward (toward the ceiling) may not provide much useful information and this camera could be turned off.

In one embodiment, a number of computer vision parameters may be based on a determination of an outdoor context.

For example, based on an outdoor determination, computer vision parameters may configure vision to use one or more of: a panoramic model or tracker, dynamic world modeling, predetermined outdoor structural features, distant features, or images from a ground facing camera.

In some embodiments, for outdoor scenes containing distant (i.e., far off) features, optimizing computer vision by expecting distant features can be beneficial for orientation determination and tracking. The CALMT can use horizon line features for heading determination and the horizon line can help to calibrate sensor-camera alignment.

In some embodiments, outdoor environments often lack man-made structural features such as indoor objects, prominent rectilinear shapes, or prominent lines. In some embodiments, the CALMT can optimize computer vision to prioritize 3D points or features rather than attempting to search for or process a scene based on indoor objects, rectilinear shapes or prominent lines.

In some embodiments, for outdoor scenes contain distant (i.e., far off) features. In some embodiments, optimizing computer vision by expecting distant features can be beneficial for orientation determination and tracking. For example, the CALMT may use horizon line features for heading determination and the horizon line can help to calibrate sensor-camera alignment.

In some embodiments, outdoor context related computer vision parameters may also bypass or disable data collection from the camera that points upwards towards the sky. Furthermore, in some embodiments, while in a city, mapping may be most efficient at several feet above the ground (due to dynamic objects) or when the camera is pointed towards the ground. In some embodiments, the CALMT may use location, and viewing direction with respect to gravity to determine if a scene in view is feasible for mapping based on one or more camera views/sensors.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), a tablet, a mobile computer, a laptop computer, a tablet, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a server, a point-of-sale device, an entertainment device, a set-top box, or any other suitable device. These devices may have different power and data requirements and may result in different power profiles generated for each feature or set of features.

In some aspects a wireless device may comprise an access device (e.g., a Wi-Fi access point) for a communication system. Such an access device may provide, for example, connectivity to another network through transceiver 140 (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively nonportable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments (e.g., CALMT), the functions or modules described may be implemented in hardware (e.g., hardware 162), software (e.g., software 165), firmware (e.g., firmware 163), or any combination thereof. If implemented in software as a computer program product, the functions or modules may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A machine-implemented method for performing a computer vision task, the method comprising:
    inferring a context of a user or device, wherein the context comprises one or more of motion, activity, environment, or location, or any combination thereof;
    configuring a computer vision task according to the inferred context; and
    performing the computer vision task, wherein the computer vision task comprises at least one of:
    mapping of an environment of the device,
    localizing of the device or an object within the environment of the device,
    tracking of the device within the environment of the device, or
    any combination thereof.

2. The machine-implemented method of claim 1, wherein the inferring a context comprises reading sensor data to infer the context of the user or the device, wherein the sensor data is from one or more of: Bluetooth sensor, microphone, camera(s), global positioning sensor (GPS), WiFi, proximity sensor, temperature sensor, barometric (i.e., pressure) sensor, ambient light sensor (ALS), red-green-blue (RGB) color sensor, ultra-violet (UV) sensor, UV-A sensor, UV-B sensor, fingerprint sensor, touch sensor, accelerometer, gyro, compass, magnetometer, or any combination thereof.

3. The machine-implemented method of claim 1, wherein the inferring a context comprises reading application data to infer the context of the user or the device, wherein the application data is from one or more of: calendar, geo tagging, social media data, battery, time of day, or any combination thereof.

4. The machine-implemented method of claim 1, wherein the configuring the computer vision task includes one or more of:
    selecting parameters of an algorithm associated with the task;
    selecting a prior model as inputs to the algorithm associated with the task;
    selecting an approach to solve the problem based on environment constants; or any combination thereof.

5. The machine-implemented method of claim 4, wherein the configuring the computer vision task includes one or more of:
    using edge based methods;
    using point based methods;
    using rectangle based methods; or
    any combination thereof.

6. The machine-implemented method of claim 1, wherein the context is an indoor context and the computer vision task uses information associated with the indoor context to modify the computer vision task configuration for use with one or more of: an aligned rectangle coordinate system, bounded interior scene dimensions, predetermined objects, indoor structural features, or any combination thereof.

7. The machine-implemented method of claim 1, wherein the context is an outdoor context and the computer vision task uses information associated with the outdoor context to modify the computer vision task configuration for use with one or more of: dynamic world modeling, predetermined outdoor structural features, distant features, a panoramic model or tracker, images from a ground facing camera, or any combination thereof.

8. The machine-implemented method of claim 1, wherein the context is a cluttered context and the computer vision task uses information associated with the cluttered context to modify the computer vision task configuration for use with one or more of: feature point calculations, increasing a keyframe rate, or any combination thereof.

9. The machine-implemented method of claim 1, wherein the context is an uncluttered context and the computer vision task uses information associated with the uncluttered context to modify the computer vision task for use with one or more of:
    decreasing a keyframe rate,
    using one or more features of: lines, vanishing points, rectangles, or any combination thereof, or
    any combination thereof.

10. The machine-implemented method of claim 1, wherein when the context is an excited context, the computer vision task increases a number of tracked features, and wherein when the context is an unexcited context the computer vision task decreases the number of tracked features.

11. The machine-implemented method of claim 1, wherein the context is a dynamic context and the computer vision task uses information associated with the dynamic context to modify the computer vision task configuration for use with one or more of:
    delaying performing the computer vision task until the context is determined to be static,
    selecting one of a plurality of camera sensors to capture a static portion of the dynamic environment and performing the computer vision task using the selected camera sensor, or
    any combination thereof.

12. The machine-implemented method of claim 1, wherein the context is a combination of two or more of: a location context, an environment context, an activity context, a motion context, or any combination thereof.

13. The machine-implemented method of claim 1, further comprising:
    providing, for the computer vision task, a suggested camera direction or viewpoint based on the inferred context.

14. A machine readable non-transitory storage medium containing executable program instructions which cause a data processing device to perform a method for performing a computer vision task, the method comprising:

inferring a context of a user or device, wherein the context comprises one or more of: motion, activity, environment, location, or any combination thereof;
configuring a computer vision task according to the inferred context; and
performing the computer vision task, wherein the computer vision task comprises at least one of:
mapping of an environment of the device,
localizing of the device or an object within the environment of the device,
tracking of the device within the environment of the device, or any combination thereof.

15. The medium of claim 14, wherein the inferring a context comprises reading sensor data to infer the context of the user or the device, wherein the sensor data is from one or more of: Bluetooth sensor, microphone, camera(s), global positioning sensor (GPS), WiFi, proximity sensor, temperature sensor, barometric (i.e., pressure) sensor, ambient light sensor (ALS), red-green-blue (RGB) color sensor, ultra-violet (UV) sensor, UV-A sensor, UV-B sensor, fingerprint sensor, touch sensor, accelerometer, gyro, compass, magnetometer, or any combination thereof.

16. The medium of claim 14, wherein the inferring a context comprises reading application data to infer the context of the user or the device, wherein the application data is from one or more of: calendar, geo tagging, social media data, battery, time of day, or any combination thereof.

17. The medium of claim 14, wherein the context comprises one or more of: motion, activity, environment, location, or any combination thereof.

18. The medium of claim 14, wherein the configuring the computer vision task includes one or more of:
selecting parameters of an algorithm associated with the task;
selecting a prior model as inputs to the algorithm associated with the task;
selecting an approach to solve the problem based on environment constants; or
any combination thereof.

19. The medium of claim 18, wherein the configuring the computer vision task includes one or more of:
using edge based methods;
using point based methods;
using rectangle based methods; or
any combination thereof.

20. The medium of claim 14, wherein the context is an indoor context and the computer vision task uses information associated with the indoor context to modify the computer vision task configuration for use with one or more of: an aligned rectangle coordinate system, bounded interior scene dimensions, predetermined objects, indoor structural features, or any combination thereof.

21. The medium of claim 14, wherein the context is an outdoor context and the computer vision task uses information associated with the outdoor context to modify the computer vision task configuration for use with one or more of: dynamic world modeling, predetermined outdoor structural features, distant features, a panoramic model or tracker, images from a ground facing camera, or any combination thereof.

22. The medium of claim 14, wherein the context is a cluttered context and the computer vision task uses information associated with the cluttered context to modify the computer vision task configuration for use with one or more of: feature point calculations, increasing a keyframe rate, or any combination thereof.

23. The medium of claim 14, wherein the context is an uncluttered context and the computer vision task uses information associated with the uncluttered context to modify the computer vision task configuration for use with one or more of:
decreasing a keyframe rate,
using one or more features of: lines, vanishing points, rectangles, or any combination thereof, or
any combination thereof.

24. The medium of claim 14, wherein when the context is an excited context the computer vision task increases a number of tracked features, and wherein when the context is an unexcited context the computer vision task decreases the number of tracked features.

25. The medium of claim 14, wherein the context is a dynamic context and the computer vision task uses information associated with the dynamic context to modify the computer vision task configuration for use with one or more of:
delaying performing computer the vision task until the context is determined to be static,
selecting one of a plurality of camera sensors to capture a static portion of the dynamic environment and performing the computer vision task using the selected camera sensor, or
any combination thereof.

26. The medium of claim 14, wherein the context is a combination of two or more of: a location context, an environment context, an activity context, a motion context, or any combination thereof.

27. The medium of claim 14, further comprising:
providing, for the computer vision task, a suggested camera direction or viewpoint based on the inferred context.

28. A system for performing a computer vision task, the system comprising:
a processor; and
a storage device coupled to the processor and configurable for storing instructions, which, when executed by the processor cause the processor to:
infer a context of a user or device, wherein the context comprises one or more of: motion, activity, environment, location, or any combination thereof;
configure a computer vision task according to the inferred context; and
perform the computer vision task, wherein the computer vision task is configured to:
map an environment of the device,
localize the device or an object within the environment of the device, or
track the device within the environment of the device.

29. The system of claim 28, wherein the inferring a context comprises reading sensor data to infer the context of the user or the device, wherein the sensor data is from one or more of: Bluetooth sensor, microphone, camera(s), global positioning sensor (GPS), WiFi, proximity sensor, temperature sensor, barometric (i.e., pressure) sensor, ambient light sensor (ALS), red-green-blue (RGB) color sensor, ultra-violet (UV) sensor, UV-A sensor, UV-B sensor, fingerprint sensor, touch sensor, accelerometer, gyro, compass, magnetometer, or any combination thereof.

30. The system of claim 28, wherein the inferring a context comprises reading application data to infer the context of the user or the device, wherein the application data is from one or more of: calendar, geo tagging, social media data, battery, time of day, or any combination thereof.

31. The system of claim 28, wherein the configuring the computer vision task comprises the processor executing one or more of instructions to:

select parameters of an algorithm associated with the task;
select a prior model as inputs to the algorithm associated with the task;
select an approach to solve the problem based on environment constants; or
any combination thereof.

32. The system of claim 31, wherein the configuring the computer vision task comprises the processor executing one or more of instructions to:
use edge based methods;
use point based methods;
use rectangle based methods; or
any combination thereof.

33. The system of claim 28, wherein the context is an indoor context and the computer vision task uses information associated with the indoor context to modify the computer vision task configuration for use with one or more of: an aligned rectangle coordinate system, bounded interior scene dimensions, predetermined objects, indoor structural features, or any combination thereof.

34. The system of claim 28, wherein the context is an outdoor context and the computer vision task uses information associated with the outdoor context to modify the computer vision task configuration for use with one or more of: dynamic world modeling, predetermined outdoor structural features, distant features, a panoramic model or tracker, images from a ground facing camera, or any combination thereof.

35. The system of claim 28, wherein the context is a cluttered context and the computer vision task uses information associated with the cluttered context to modify the computer vision task configuration for use with one or more of: feature point calculations, increasing a keyframe rate, or any combination thereof.

36. The system of claim 28, wherein the context is an uncluttered context and the computer vision task uses information associated with the uncluttered context to modify the computer vision task configuration for use with one or more of instructions to:
decrease a keyframe rate,
use one or more features of: lines, vanishing points, rectangles, or any combination thereof, or
any combination thereof.

37. The system of claim 28, wherein when the context is an excited context the computer vision task increases a number of tracked features, and wherein when the context is an unexcited context the computer vision task decreases the number of tracked features.

38. The system of claim 28, wherein the context is a dynamic context and the computer vision task uses information associated with the dynamic context to modify the computer vision task configuration for use with one or more of instructions to:
delay performing the computer vision task until the context is determined to be static,
select one of a plurality of camera sensors to capture a static portion of the dynamic environment and performing the computer vision task using the selected camera sensor, or
any combination thereof.

39. The system of claim 28, wherein the context is a combination of two or more of: a location context, an environment context, an activity context, a motion context, or any combination thereof.

40. The system of claim 28, further comprising instructions to:
provide, for the computer vision task, a suggested camera direction or viewpoint based on the inferred context.

41. An apparatus for performing a computer vision task, the apparatus comprising:
means for inferring a context of a user or device, wherein the context comprises one or more of: motion, activity, environment, location, or any combination thereof;
means for configuring a computer vision task according to the inferred context; and
means for performing the computer vision task, wherein the computer vision task comprises at least one of:
a mapping of an environment of the device,
a localizing the device or an object within the environment of the device,
a tracking of the device within the environment of the device, or
any combination thereof.

42. The apparatus of claim 41, wherein the means for inferring a context comprises means for reading sensor data to infer the context of the user or the device, wherein the sensor data is from one or more of: Bluetooth sensor, microphone, camera(s), global positioning sensor (GPS), WiFi, proximity sensor, temperature sensor, barometric (i.e., pressure) sensor, ambient light sensor (ALS), red-green-blue (RGB) color sensor, ultra-violet (UV) sensor, UV-A sensor, UV-B sensor, fingerprint sensor, touch sensor, accelerometer, gyro, compass, magnetometer, or any combination thereof.

43. The apparatus of claim 41, wherein the means for inferring a context comprises means for reading application data to infer the context of the user or the device, wherein the application data is from one or more of: calendar, geo tagging, social media data, battery, time of day, or any combination thereof.

44. The apparatus of claim 41, wherein the means for configuring the computer vision task includes one or more of:
means for selecting parameters of an algorithm associated with the task;
means for selecting a prior model as inputs to the algorithm associated with the task;
means for selecting an approach to solve the problem based on environment constants, or
any combination thereof.

45. The apparatus of claim 44, wherein the means for configuring the computer vision task further includes one or more of:
means for using edge based methods;
means for using point based methods;
means for using rectangle based methods; or
any combination thereof.

46. The apparatus of claim 41, wherein the context is an indoor context and the computer vision task uses information associated with the indoor context to modify the computer vision task configuration for use with one or more of: an aligned rectangle coordinate system, bounded interior scene dimensions, predetermined objects, indoor structural features, or any combination thereof.

47. The apparatus of claim 41, wherein the context is an outdoor context and the computer vision task uses information associated with the outdoor context to modify the computer vision task configuration for use with one or more of: dynamic world modeling, predetermined outdoor structural features, distant features, a panoramic model or tracker, images from a ground facing camera, or any combination thereof.

48. The apparatus of claim 41, wherein the context is a cluttered context and the computer vision task uses information associated with the cluttered context to modify the computer vision task configuration for use with one or more of: feature point calculations, increasing a keyframe rate, or any combination thereof.

49. The apparatus of claim 41, wherein the context is an uncluttered context and the computer vision task uses information associated with the uncluttered context to modify the computer vision task configuration for use with one or more of:
- means for decreasing a keyframe rate, or
- means for using one or more features of: lines, vanishing points, rectangles, or any combination thereof, or
- any combination thereof.

50. The apparatus of claim 41, wherein when the context is an excited context the computer vision task increases a number of tracked features, and wherein when the context is an unexcited context the computer vision task decreases the number of tracked features.

51. The apparatus of claim 41, wherein the context is a dynamic context and the computer vision task uses information associated with the dynamic context to modify the computer vision task configuration for use with one or more of:
- means for delaying performing the computer vision task until the context is determined to be static,
- means for selecting one of a plurality of camera sensors to capture a static portion of the dynamic environment and performing the computer vision task using the selected camera sensor, or
- any combination thereof.

52. The apparatus of claim 41, wherein the context is a combination of two or more of: a location context, an environment context, an activity context, a motion context, or any combination thereof.

53. The apparatus of claim 41, further comprising:
- means for providing, for the computer vision task, a suggested camera direction or viewpoint based on the inferred context.

54. A machine-implemented method for performing a computer vision task, the method comprising:
- inferring a context of a user or device, wherein the inferring a context comprises reading sensor data to infer the context of the user or the device, wherein the sensor data is from one or more of: Bluetooth sensor, microphone, camera(s), global positioning sensor (GPS), WiFi, proximity sensor, temperature sensor, barometric (i.e., pressure) sensor, ambient light sensor (ALS), red-green-blue (RGB) color sensor, ultra-violet (UV) sensor, UV-A sensor, UV-B sensor, fingerprint sensor, touch sensor, accelerometer, gyro, compass, magnetometer, or any combination thereof;
- configuring a computer vision task according to the inferred context; and
- performing the computer vision task, wherein the computer vision task further comprises at least one of:
- mapping of an environment of the device,
- localizing of the device or an object within the environment of the device,
- tracking of the device within the environment of the device, or
- any combination thereof.

55. A machine-implemented method for performing a computer vision task, the method comprising:
- inferring a context of a user or device, wherein the inferring a context comprises reading application data to infer the context of the user or the device, wherein the application data is from one or more of: calendar, geo tagging, social media data, battery, time of day, or any combination thereof;
- configuring a computer vision task according to the inferred context; and
- performing the computer vision task, wherein the computer vision task further comprises at least one of:
- mapping of an environment of the device,
- localizing of the device or an object within the environment of the device,
- tracking of the device within the environment of the device, or
- any combination thereof.

* * * * *